United States Patent
Oshima et al.

(10) Patent No.: US 6,266,978 B1
(45) Date of Patent: Jul. 31, 2001

(54) METHOD FOR PRODUCING SYNTHETIC QUARTZ GLASS FOR USE IN ARF EXCIMER LASER LITHOGRAPHY

(75) Inventors: Takayuki Oshima; Akira Fujinoki; Hiroyuki Nishimura; Yasuyuki Yaginuma, all of Koriyama (JP)

(73) Assignees: Heraeus Quarzglas GmbH, Hanau (DE); Shin-Etsu Quartz Products Co., Ltd., Tokyo (JP)

( * ) Notice: Subject to any disclaimer, the term of this patent is extended or adjusted under 35 U.S.C. 154(b) by 0 days.

(21) Appl. No.: 09/392,427

(22) Filed: Sep. 9, 1999

(30) Foreign Application Priority Data

Sep. 10, 1998 (JP) ................................. 10-272471
Jan. 20, 1999 (JP) ................................. 11-011907

(51) Int. Cl.$^7$ ................................. C03B 32/00
(52) U.S. Cl. .................... 65/33.2; 65/425; 204/157.15; 204/157.4; 204/157.41; 204/157.44; 204/157.45; 264/1.37; 264/1.38; 385/141; 385/142; 385/144
(58) Field of Search ............... 65/33.2, 425; 204/157.15, 204/157.4, 157.41, 157.44, 157.45; 264/1.37, 1.38, 235, 346, 482; 385/141, 142, 144; 501/900, 905

(56) References Cited

U.S. PATENT DOCUMENTS 5,325,230   6/1994   Yamagata et al. .................... 359/350

FOREIGN PATENT DOCUMENTS

| 0870737 | 10/1998 | (EP) . |
| 2762188 | * 3/1988 | (JP) . |
| 7-100671 | * 4/1995 | (JP) . |
| WO9716382 | 5/1997 | (WO) . |

OTHER PUBLICATIONS

European Search Report.
Patent Abstracts of Japan—pub #10053432.
Derwent Publications XP 2146 304.

* cited by examiner

Primary Examiner—Michael P. Colaianni
(74) Attorney, Agent, or Firm—Milde, Hoffberg & Macklin, LLP

(57) ABSTRACT

A simple method for producing a synthetic quartz glass having excellent homogeneity and high transmittance, which is useful as an optical material in producing steppers equipped with an ArF excimer laser as a radiation source. A method for producing a synthetic quartz glass for use in ArF excimer laser lithography, which comprises irradiating a highly homogeneous synthetic quartz glass containing less than 60 ppb of Na with ultraviolet radiation having a maximum wavelength of 260 nm for not less than the duration expressed by the equation:

$$Y=(80X-1880)/Z$$

wherein X represents an Na concentration (ppb), Y represents the duration of irradiation (hours), and Z represents the illuminance of an ultraviolet radiation on an irradiated surface (mW/cm$^2$).

6 Claims, 2 Drawing Sheets

METHOD FOR PRODUCING SYNTHETIC QUARTZ GLASS FOR USE IN ARF EXCIMER LASER LITHOGRAPHY

FIELD OF THE INVENTION

The present invention relates to a method for producing a synthetic quartz glass for use in the optical system of a lithographic exposure system equipped with excimer laser radiation as a light source. More particularly, the present invention relates to a method for producing a synthetic quartz glass for use in the illumination systems and projection systems of an ArF excimer laser lithographic exposure system, such as a lens, a prism, and a beam splitter.

BACKGROUND OF THE INVENTION

Recently, the patterns of integrated circuits produced on a wafer have become finer with the increasing degree of integration in LSIs; furthermore, mass production of super LSIs having super-fine patterns of quarter micrometers (0.25 $\mu$m) or less in fineness is now under way. To obtain such super-fine patterns, it is also necessary to use exposure light sources having a shorter wavelength, and steppers using excimer laser radiation as the light source have been developed. The steppers equipped with KrF excimer laser radiation (248 nm in wavelength) as the light source have already been put to practical use. Furthermore, steppers equipped with ArF excimer laser radiation (193 nm in wavelength) as the light source are attracting much attention as a promising stepper of the next generation. As a glass material which exhibits sufficiently high transmittance in the short wavelength region of the KrF excimer laser and ArF excimer laser radiations, there can be mentioned a quartz glass, fluorite, etc. Particularly among them, a synthetic quartz glass prepared by fusion and vitrification of a product obtained by flame hydrolysis of a high purity silicon compound and the like is preferred as an optical material for lithography using excimer laser radiation as the light source, because it exhibits high transmittance in the short wavelength region of 260 nm or less.

In the case of employing the synthetic quartz glass mentioned above as an optical materials for use in lithography using excimer laser radiation as the light source, and particularly, in the case of using ArF excimer laser radiation, it is required that the glass has an internal transmittance of approximately 99.8% for a light 193 nm in wavelength, and that it is highly homogeneous so that it provides excellent imaging properties, as described in Japanese Patent Laid-Open No. 53432/1998. The homogeneity of a synthetic quartz glass is generally achieved by applying a homogenization treatment to a synthetic quartz glass ingot obtained by fusion and vitrification of a product obtained by flame hydrolysis of a high purity silicon compound and the like. However, because the synthetic quartz glass ingot is exposed for a long period of time at high temperatures in the homogenization treatment, there occurs contamination due to the impurities generated from the refractories such as alumina, zirconia, graphite, etc., which constitute the furnace material. The loss of transmittance due to the contamination is found particularly noticeable in the case where ArF excimer laser radiation is used; thus, it is unfeasible to use the synthetic quartz glass impaired in transmittance due to this contamination as the optical materials for steppers employing an ArF excimer laser as the light source.

Accordingly, the present inventors proposed a method for recovering the loss in transmittance of a synthetic quartz glass contaminated by the aforementioned homogenization treatment in Japanese Patent Application No. 2762188. In accordance with the method described in that Japanese Patent Application, it has been found that the transmittance for ArF excimer laser radiation is recovered, and that the internal transmittance for a light having a wavelength of 193 nm is recovered to about 99.8%. However, the products thus obtained were not always the same, and it was hence difficult to maintain a stable production of synthetic quartz glass for use in ArF excimer laser lithography. On the other hand, in Japanese Patent Laid-Open No. 53432/1998, there is proposed a synthetic quartz glass for use in ArF excimer laser lithography, which is obtained by a method comprising achieving homogeneous refractive index during synthesis and without applying secondary heating treatment such as homogenization, because several parts per billion of Na are mixed into the glass during the secondary heat treatment. The synthetic quartz glass described in Japanese Patent Laid-Open No. 53432/1998 has an Na concentration of 20 ppb or less, and if the Na concentration is more than 20 ppb, 5 to 100 ppb of Al is required to be contained (see paragraphs [0017] to [0019]). However, because a synthetic quartz glass is produced by depositing silica soot which is generated by flame hydrolysis of silane used as the starting material, followed by fusion and vitrification, superior homogeneity within the plane vertical to the direction of growth of the synthetic quartz glass (i.e., the longitudinal direction) can be readily achieved, however, it is technologically extremely difficult to increase the homogeneity in the direction parallel with the direction of growth (i.e., the lateral direction), because the stripes that generate with the growth, i.e., the so-called layers or layer-structure, are formed in this direction. Furthermore, the production method described in the unexamined published Japanese Patent Application mentioned above makes the apparatus very complicated and expensive, because it requires, in addition to the rotation of the target plate, operations such as vibrating and pulling down as well as the operation of maintaining the synthetic plane and the burner apart from each other at a constant distance. Moreover, the diffusion constant of Al in quartz glass is as small as $1 \times 10^{-13}$ cm$^2$/sec, which is extremely lower than the diffusion constant of Na, i.e., $7.9 \times 10^{-6}$ cm$^2$/sec (refer to "Handbook of Glass Properties" (Academic Press)). Thus, it is technologically difficult to homogeneously dope both Al and Na which greatly differ from each other in diffusion constants.

In light of the aforementioned circumstances, extensive studies were conducted on the development of synthetic quartz glass for use in ArF excimer laser lithography having high homogeneity and high transmittance. As a result, it has been found that the production method proposed in Japanese Patent No. 2762188 is most suitable from the viewpoint of its ease in carrying out and its low cost. Further studies have been performed on that production method. It has now been found that the fluctuation of the product quality is attributable to the concentration of Na contained in the synthetic quartz glass, and that by specifying the range of Na concentration and by irradiating at an ultraviolet radiation 260 nm or shorter in wavelength at a specified luminance and for a specified time duration, it is possible to maintain a stable production of a synthetic quartz glass having high homogeneity and yet high transmittance for an ArF excimer laser radiation.

SUMMARY OF THE INVENTION

It is an object of the present invention to provide a method for maintaining stable production of a synthetic quartz glass for ArF excimer lasers, which has an excellent homogeneity and high transmittance of ArF excimer laser radiation.

It is an object of the present invention to provide a simple method for producing a synthetic quartz glass having excellent homogeneity and high transmittance, which is useful as an optical material in producing steppers equipped with an ArF excimer laser as a radiation source.

These objects and others that will become apparent from the following specification are achieved by providing a method for producing a synthetic quartz glass for use in ArF excimer laser lithography, which comprises irradiating a highly homogeneous synthetic quartz glass containing less than 60 ppb of Na with an ultraviolet radiation having a wavelength of 260 nm or less for not less than the time duration expressed by the following equation 2

$$Y=(80X-1880)/Z$$

wherein X represents an Na concentration (ppb), Y represents the time duration of irradiation (hours) and Z represents the illuminance of ultraviolet radiation on an irradiated surface ($mW/cm^2$).

In the present invention, the term "having high homogeneity" signifies a state in which the refraction index distribution within the optical plane (clear aperture) is controlled to be $2\times10^{-5}$ or less and the striae in three directions and the internal stress are removed, which is obtained by subjecting a high purity silicon compound to flame hydrolysis, obtaining therefrom a synthetic quartz glass ingot by fusion and vitrification, and subjecting the resulting ingot to either homogenization treatment or homogenization treatment followed by molding and stress removal (referred to hereinafter as homogenization treatment and the like). The synthetic quartz glass is produced by either direct method comprising depositing a soot produced by flame hydrolysis of a high purity silicon compound such as silicon tetrachloride, methyl trimethoxysilane, tetramethoxysilane, etc., on a target, while simultaneously fusing it and vitrifying, or by a soot method comprising depositing the soot on a target, and then vitrifying it by heating and fusing in an electric furnace. As the homogenization treatment above, there can be mentioned a method which comprises subjecting the synthetic quartz glass ingot to a heat treatment at 2000° C. for a long duration of time in a refractory furnace or a method of zone melting the synthetic quartz glass, etc. However, preferred is a method of zone melting described in Japanese Patent Laid-Open No. 267662/1995 (referred to hereinafter as the zone melting method), which comprises zone melting a synthetic quartz glass ingot by supporting both ends in the longitudinal direction of the synthetic quartz glass ingot with a supporting member and rotating the ingot around the axis connecting the support ends; deforming the ingot into a shape protruding outward in the zone melting region by applying pressure in the direction of the supporting axis, thereby producing a synthetic quartz glass ingot having low optical homogeneity in the direction perpendicular to the direction of optical homogeneity along the direction of supporting axis; and after supporting the ingot by the side planes above using a support, applying thereto homogenization treatment similar to above.

The synthetic quartz glass subjected to the homogenization treatment and the like is then subjected to the irradiation of ultraviolet radiation. However, a preferred synthetic quartz glass is a synthetic quartz glass molding subjected to homogenization treatment, molding, and stress-removal treatment. The "molding" referred above is a process which comprises forming the synthetic quartz glass to a shape such as a cube, disk, pyramid, etc., which is required for an optical material, and the "stress-removal treatment" is a process which comprises removing internal stress of the synthetic quartz glass. Because the homogenization treatment and the like are performed in a refractory furnace or in a heat-resistant furnace, contamination is generated due to the impurities from the furnace material. In particular, the contamination of Na is a serious problem, because the presence of Na in the synthetic quartz glass generates an absorption band around a wavelength of 180 nm thereby greatly reducing the transmittance of ArF excimer laser radiation. It has been found that a homogenization treatment performed at a temperature of 2000° C. incorporates 30 ppb or more of Na, whereas each of the molding and the stress-removal treatment steps incorporates from 5 to 10 ppb of Na. However, in the zone melting method, the synthetic quartz glass ingot is less contaminated, because it is not brought into contact with the furnace material and the jigs, and the Na content is as low as about 20 ppb, and even after molding, the content can be suppressed to about 24 ppb. On the other hand, if the Na content exceeds 60 ppb, as is shown in FIG. 1, the recovery on irradiating with ultraviolet radiation of 260 nm or shorter in wavelength the results are insufficient, and the internal transmittance for a light 193 nm in wavelength cannot be recovered to about 99.8%. Accordingly, it is requisite that the Na content in the synthetic quartz glass subjected to the ultraviolet irradiation treatment according to the present invention is in a range of from 20 to 60 ppb.

For the ultraviolet radiation of 260 nm or less in wavelength, particularly preferred is a continuous light, and the ultraviolet radiation should be conducted for a time duration expressed by the general equation 3:

$$Y=(80X-1880)/Z$$

wherein X represents an Na concentration (ppb), Y represents the time duration of irradiation (hours), and Z represents the illuminance of the ultraviolet radiation on an irradiated surface ($mW/cm^2$).

Even though the Na content should be in a range of from 20 to 60 ppb, as is shown in FIG. 2, preferably in the range of from 24 to 60 ppb, the internal transmittance of the synthetic quartz glass cannot be recovered to the allowable limit of about 99.8% if the duration of the irradiation is less than the range satisfying the general equation 3 above. Furthermore, even if the duration and the luminance should satisfy the general equation 3 above, the internal transmittance for a light 193 nm in wavelength cannot be recovered to about 99.8% if the Na concentration in synthetic quartz glass is not in the range of from 20 to 60 ppb. In FIG. 2 above, it can be seen that there is a relation expressed by general equation 3 among X, Y, and Z from the linear regression, where X represents the Na content (ppb), Y represents the duration of irradiation (hour), and Z represents the illuminance of ultraviolet radiation on an irradiated surface ($mW/cm^2$). Furthermore, it is clear from Table 3 that the time duration of irradiation is inversely proportional to the illuminance. As a lamp for use in the ultraviolet irradiation mentioned above, there may be used a low vapor pressure mercury lamp having the principal wavelengths 253.7 nm and 184.9 nm, an Xe excimer lamp having a wavelength of 172 nm, or a KrCl excimer lamp have a wavelength of 222 nm. Furthermore, the surface roughness $R_{max}$ of the synthetic quartz glass which has been irradiated by ultraviolet radiation is preferably 30 $\mu$m, or less. If the surface roughness Rmax should exceed 30 $\mu$m, the scattering of ultraviolet radiation increases so as to make it difficult to improve the effect of the treatment. Furthermore, the illuminance of the ultraviolet radiation should be at least 1 mW/cm$^2$. The recovery of the internal transmittance is possible even if the time duration of irradiation is elongated. However, because the life of an ultraviolet lamp is generally short, it requires an increase not only in the use of the lamp, but also in the amount of electric power and gaseous nitrogen so as to lead to an increase in cost. Yet, not much can be expected in the improvement of the irradiation effect, thus, up to twice the time duration expressed by the general equation 3 is acceptable.

DETAILED DESCRIPTION OF THE PREFERRED EMBODIMENTS

Figure 1:
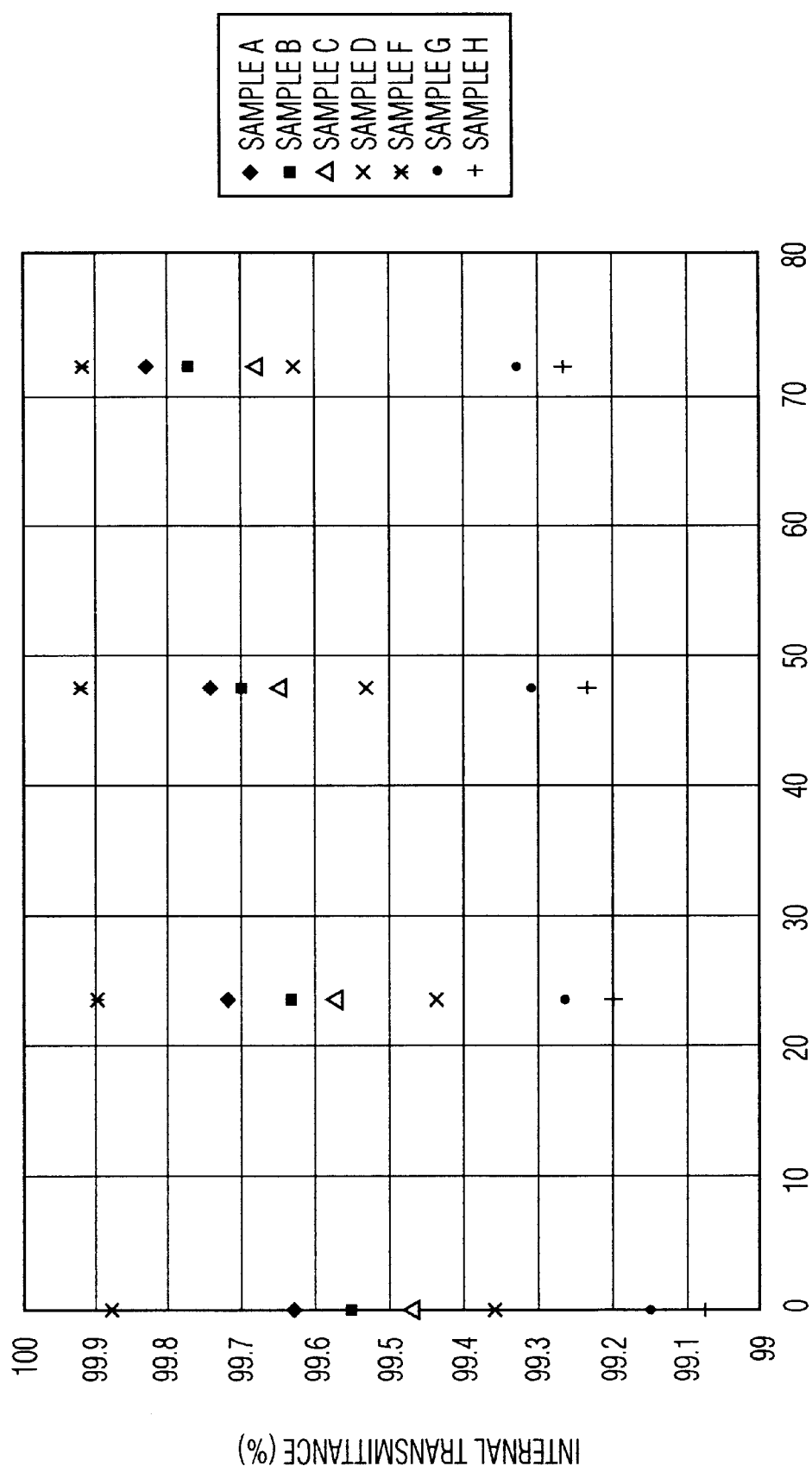
FIG. 1 is a graph showing the relation between the duration of irradiation with an ultraviolet radiation in hours and the internal transmittance in %.
Figure 2:
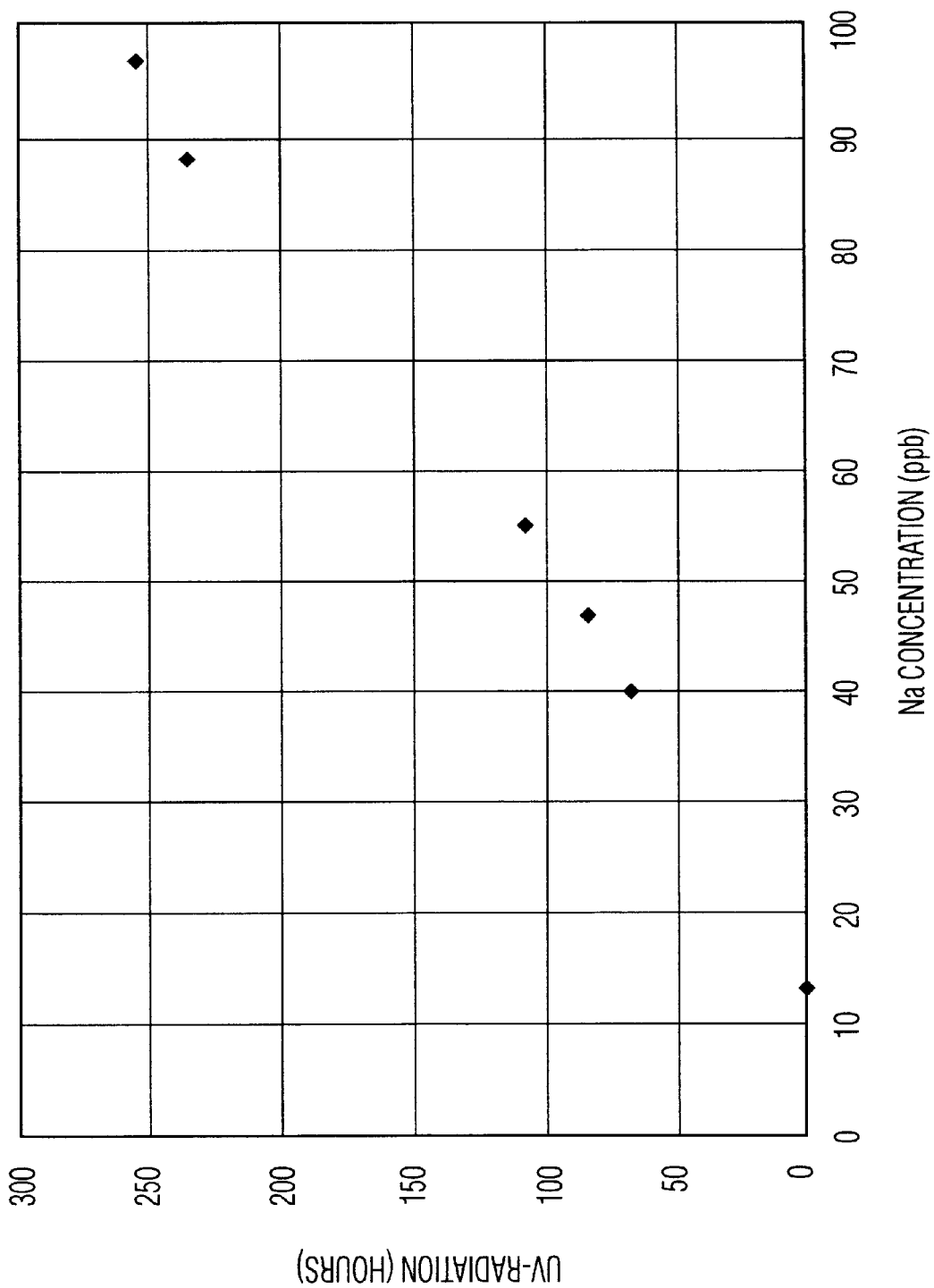
FIG. 2 is a graph showing the relation between Na concentration in ppb which provides an internal transmittance of 99.8% and the duration of irradiation with an ultraviolet radiation (hours).

The present invention is described in further detail below by referring to Examples, but it should be understood that the present invention is not limited thereto.

The physical properties in the Examples and Comparative Examples below are values obtained by the following methods of measurement:

i) Distribution of Refractive indices: Measurement method using a Fizeau interferometer.
ii) Birefringence: Measurement method using crossed nicols.
iii) Striae: Visula observation.
iv) Internal transmittance at 193 nm: A measurement method using a value of 90.68% obtained by subtracting 0.18% (a known value of loss in Rayleigh scattering) from the theoretical transmittance 90.86% of quartz glass for light of 193 nm in wavelength; the value is obtained in accordance with (T/90.68)×100, that is, it is obtained with respect to an apparent transmittance of T % at a thickness of 10 mm.
v) Na concentration: Measurement method using flame-less atomic absorption analysis.

EXAMPLE 1

A high purity methyl trimethoxysilane was introduced into an oxyhydrogen flame, was molten and deposited on a rotating base body to prepare a synthetic quartz glass ingot having an outer diameter of 100 mm and a length of 600 mm. Both ends of the resulting ingot were welded to the quartz glass supporting rods clamped by the chucks of a lathe for processing quartz glass to rotate the synthetic glass ingot. The rotating ingot was locally heated by a burner to form a melting zone, and by independently changing the direction and the speed of rotation, strain was generated in the melting zone to remove the striae from the ingot and to perform homogenization thereon. Then, by narrowing the distance between the chucks of the lathe for processing the quartz glass, pressure was applied to the synthetic quartz glass ingot to deform it into a spherical synthetic quartz glass, and the spherical synthetic quartz glass was cut out. The cut synthetic quartz glass was homogenized again by attaching it to the supporting rod on the supporting table in such a manner that the cut planes were on the upper and the lower sides thereof, and by heating and softening it using a burner while applying rotation thereto. The ingot thus obtained was found to be free of any striae in its three dimensions. For the molding described above, a graphite crucible having 20 ppm or less of ash content was used; the inside of the crucible was first replaced with gaseous nitrogen, and the temperature therein was elevated to 1900° C. and was maintained at that temperature for 10 minutes to obtain a molding. The resulting quartz glass molding having an outer diameter of 200 mm and a thickness of 135 mm was placed inside an electric furnace using 99% or higher purity alumina as the furnace material, and after keeping it at 1150° C. for a period of 50 hours, gradual cooling at a rate of 5° C./hour was applied thereto until the temperature was lowered to 600° C. Then, the product was subjected to natural cooling to perform the stress-removal treatment. After measuring the optical properties of the synthetic quartz glass molding thus obtained, a sample for measuring the transmittance having an outer diameter of 60 mm and a thickness of 10 mm (Sample A) and a fraction for use in chemical analysis were extracted from the inner side 20 mm in depth from the surface of the resulting synthetic quartz glass molding to perform the measurement of transmittance and purity analysis. The results are given in Table 1.

TABLE 1

| Sample | Δn, in optical plane | Δn, lateral direction | Striae lateral direction | Birefringence nm/cm | Internal transmittance at 193 nm | Na concentration (ppb) | Chlorine concentration (ppm) |
|---|---|---|---|---|---|---|---|
| A | $1 \times 10^{-6}$ | $4 \times 10^{-6}$ | None | <1 | 99.62% | 40 | 0 |
| B | $2 \times 10^{-6}$ | $4 \times 10^{-6}$ | None | 1 | 99.55% | 47 | 0 |
| C | $1 \times 10^{-6}$ | $3 \times 10^{-6}$ | None | <1 | 99.48% | 55 | 0 |
| D | $1 \times 10^{-6}$ | $4 \times 10^{-6}$ | None | 1 | 99.36% | 40 | 20 |
| E | $1 \times 10^{-6}$ | $3 \times 10^{-6}$ | None | <1 | 99.77% | 26 | 0 |
| F | $2 \times 10^{-5}$ | $4 \times 10^{-5}$ | Present | 20 | 99.89% | 2 | 0 |
| G | $1 \times 10^{-5}$ | $3 \times 10^{-5}$ | Present | 1 | 99.89% | 12 | 0 |
| H | $2 \times 10^{-6}$ | $4 \times 10^{-6}$ | None | 1 | 99.15% | 89 | 0 |
| I | $2 \times 10^{-5}$ | $4 \times 10^{-6}$ | None | <1 | 99.08% | 97 | 0 |

EXAMPLE 2

A synthetic quartz glass molding was prepared by an operation similar to that described in Example 1, except for changing the duration of molding to 30 minutes. After obtaining the optical properties of the resulting synthetic quartz glass molding, a sample for measuring the transmittance having an outer diameter of 60 mm and a thickness of 10 mm (Sample B) and a fraction for use in chemical analysis were extracted from the inner side 20 mm in depth from the surface of the resulting synthetic quartz glass molding to perform the measurement of transmittance and purity analysis. The results are given in Table 1.

EXAMPLE 3

A synthetic quartz glass molding was prepared by an operation similar to that described in Example 1, except for maintaining the synthetic quartz glass molding at 1150° C. for a period of 50 hours and cooling gradually thereafter to 600° C. at a cooling rate of 2° C./hour. After obtaining the optical properties of the resulting molding, a sample for measuring the transmittance having an outer diameter of 60 mm and a thickness of 10 mm (Sample C) and a fraction for use in chemical analysis were extracted from the inner side 20 mm in depth from the surface of the resulting synthetic quartz glass molding to perform the measurement of transmittance and purity analysis. The results are given in Table 1.

EXAMPLE 4

A high purity silicon tetrachloride was introduced into an oxyhydrogen flame, and was melted and deposited on a rotating base body to prepare a synthetic quartz glass ingot having an outer diameter of 100 mm and a length of 600 mm. After applying homogenization treatment, molding, and stress-removal treatment similar to those described in Example 1 to the resulting synthetic quartz glass ingot, and obtaining the optical properties thereof, a sample for measuring the transmittance having an outer diameter of 60 mm and a thickness of 10 mm (Sample D) and a fraction for use in chemical analysis were extracted from the inner side 20 mm in depth from the surface of the resulting synthetic quartz glass molding to perform the measurement of transmittance and purity analysis. The results are given in Table 1.

EXAMPLE 5

A synthetic quartz glass molding was prepared by an operation similar to that described in Example 1, except that the molding was performed by elevating the temperature to 1900° C., and then, without holding at the temperature, gradually cooling to 600° C. at a cooling rate of 5° C./hr. After obtaining the optical properties of the resulting synthetic quartz glass molding, a sample for measuring the transmittance having an outer diameter of 60 mm and a thickness of 10 mm (Sample E) and a fraction for use in chemical analysis were extracted from the inner side 20 mm in depth from the surface of the resulting synthetic quartz glass molding to perform the measurement of transmittance and purity analysis. The results are given in Table 1.

Comparative Example 1

The synthetic quartz glass ingot (Sample F) prepared in Example 1 was set inside a graphite crucible having an inner diameter of 200 mm and an ash content of 20 ppm or less without applying thereto the homogenization treatment, and the entire graphite crucible was maintained inside a nitrogen-purged crucible at 1900° C. for a duration of 10 minutes to obtain a synthetic quartz glass molding having an outer diameter of 200 mm and a thickness of 135 mm. The resulting synthetic quartz glass molding was set inside an electric furnace made of alumina 99% or higher in purity as the furnace material, and after maintaining it at 1150° C. for a period of 50 hours, it was gradually cooled to 600° C. at a cooling rate of 5° C./hr and further subjected to natural cooling to perform the stress-removal operation. After obtaining the optical properties of the resulting molding, a sample for measuring the transmittance having an outer diameter of 60 mm and a thickness of 10 mm (Sample G) and a fraction for use in chemical analysis were extracted from the inner side 20 mm in depth from the surface of the resulting synthetic quartz glass molding to perform the measurement of transmittance and purity analysis. The results are given in Table 1.

Comparative Example 2

A synthetic quartz glass molding was prepared by an operation similar to that described in Example 1, except for using a graphite crucible having an ash content of 50 ppb for the molding. After obtaining the optical properties of the resulting molding, a sample for measuring the transmittance having an outer diameter of 60 mm and a thickness of 10 mm (Sample H) and a fraction for use in chemical analysis were extracted from the inner side 20 mm in depth from the surface of the resulting synthetic quartz glass molding to perform the measurement of transmittance and purity analysis. The results are given in Table 1.

Comparative Example 3

A synthetic quartz glass molding was prepared by an operation similar to that described in Example 3, except for using an alumina furnace material having a purity of 90% as the furnace material of the heating furnace used for the stress-removal operation. After obtaining the optical properties of the resulting molding, a sample for measuring the transmittance having an outer diameter of 60 mm and a thickness of 10 mm (Sample 1) and a fraction for use in chemical analysis were extracted from the inner side 20 mm in depth from the surface of the resulting synthetic quartz glass molding to perform the measurement of transmittance and purity analysis. The results are given in Table 1.

For samples A to E and G to I above, Table 2 gives the duration of continuously irradiating with ultraviolet radiation 260 nm or shorter in wavelength at an illuminance of 20 mW/cm$^2$ and the change in internal transmittance at 193 nm.

TABLE 2

| Sample | 0 hrs | 24 hrs | 48 hrs | 72 hrs |
| --- | --- | --- | --- | --- |
| A | 99.62% | 99.71% | 99.74% | 99.82% |
| B | 99.55% | 99.63% | 99.70% | 99.77% |
| C | 99.48% | 99.58% | 99.64% | 99.68% |
| D | 99.36% | 99.43% | 99.53% | 99.62% |
| E | 99.77% | 99.85% | 99.88% | 99.90% |
| G | 99.89% | 99.90% | 99.91% | 99.92% |
| H | 99.15% | 99.25% | 99.31% | 99.33% |
| I | 99.08% | 99.20% | 99.23% | 99.27% |

From Tables 1 and 2 above, it is clear that the Samples A to E having Na Concentration in a range of from 25 to 60 ppb recovers the internal transmittance thereof to about 99.8%, but that the Samples H and I, whose Na concentration exceeds 60 ppb, the internal transmittance remains a value of 99.4% or lower even after irradiation is applied for a duration of 72 hours.

EXAMPLE 6

From the synthetic quartz glass molding of Example 1 subjected to homogenization treatment, a sample for measuring the transmittance having an outer diameter of 60 mm and a thickness of 10 mm and a fraction for use in chemical analysis were extracted from the inner side 20 mm in depth from the surface of the resulting synthetic quartz glass molding to perform continuous ultraviolet radiation 260 nm or shorter in wavelength at an illuminance of 10 mW/cm$^2$.

The time duration of irradiation and the change in internal transmittance at 193 nm are given in Table 3.

EXAMPLE 7

The same procedure as described in Example 6 was performed except for changing the illuminance to 7 mW/cm$^2$, and the duration of irradiation and the change in internal transmittance at 193 nm were obtained. The results are given in Table 3.

TABLE 3

| Illuminance | Internal transmittance for 193-nm light | | | |
|---|---|---|---|---|
| mW/cm$^2$ | 0 hrs | 48 hrs | 96 hrs | 144 hrs |
| 10 | 99.61% | 99.71% | 99.77% | 99.79% |
| 7 | 99.62% | 99.67% | 99.72% | 99.74% |

From Table 3 above, it can be clearly seen that the duration of irradiation necessary to recover an internal transmittance for a 193-nm light to about 99.8% is inversely proportional to the illuminance.

The foregoing specification and drawings have thus described and illustrated a novel method for producing synthetic quartz glass for use in ArF excimer laser lithography. Many changes, modifications, variations and other uses and applications of the subject invention will, however, become apparent to those skilled in the art after considering this specification which discloses the preferred embodiments thereof. All such changes, modifications, variations and other uses and applications which do not depart from the spirit and scope of the invention are deemed to be covered by the invention, which is to be limited only by the claims which follow.

What is claimed is:

1. A method for producing a synthetic quartz glass for use in ArF excimer laser lithography, which comprises irradiating a highly homogeneous synthetic quartz glass containing 20 to 60 ppb of Na with ultraviolet radiation having a maximum wavelength about 260 nm for not less than the time period expressed by the following equation:

$$Y=(80X-1880)/Z,$$

wherein X represents an Na concentration in ppb, Y represents the time period of irradiation in hours, and Z represents the illuminance of an ultraviolet radiation on an irradiated surface in mW/cm$^2$.

2. A method for producing a synthetic quartz glass for use in ArF excimer laser lithography as claimed in claim 1, wherein the highly homogeneous synthetic quartz glass contains about 24 to 60 ppb of Na.

3. A method for producing a synthetic quartz glass for use in ArF excimer laser lithography as claimed in claim 1, wherein the ultraviolet radiation having a maximum wavelength of about 260 nm is produced by a low vapor pressure mercury lamp having a dominant wavelength of about 253.7 nm and about 184.9 nm, an Xe excimer lamp having a wavelength of about 172 nm, or a KrCl excimer lamp having a wavelength of about 222 nm.

4. A method for producing a synthetic quartz glass for use in ArF excimer laser lithography as claimed in claim 1, wherein the highly homogeneous synthetic quartz glass containing 20 to 60 ppb of Na is a synthetic quartz glass subjected to either a homogenization treatment or a homogenization treatment followed by molding and stress-removal treatment.

5. A method for producing a synthetic quartz glass for use in ArF excimer laser lithography as claimed in claim 1, wherein the synthetic quartz glass comprises a synthetic quartz glass molded form subjected to a homogenization treatment followed by molding and a stress-removal treatment.

6. A method for producing a synthetic quartz glass for use in ArF excimer laser lithography as claimed in claim 5, wherein the synthetic quartz glass molded form is a disk and has a surface roughness R$_{max}$ of about 30 µm or less.

\* \* \* \* \*